H. M. & M. SINES.
AUTOMATIC SLEIGH BRAKE.
APPLICATION FILED APR. 9, 1913.

1,077,919.

Patented Nov. 4, 1913.

Witnesses
Robert M. Sutphen
A. I. Hind

Inventors
Henry M. Sines
Martin Sines

By Watson E. Coleman
Attorney

UNITED STATES PATENT OFFICE.

HENRY M. SINES AND MARTIN SINES, OF FARRIS, WASHINGTON.

AUTOMATIC SLEIGH-BRAKE.

1,077,919.  Specification of Letters Patent.  Patented Nov. 4, 1913.

Application filed April 9, 1913. Serial No. 759,963.

*To all whom it may concern:*

Be it known that we, HENRY M. SINES and MARTIN SINES, citizens of the United States, residing at Farris, in the county of Chelan and State of Washington, have invented certain new and useful Improvements in Automatic Sleigh-Brakes, of which the following is a specification, reference being had to the accompanying drawings.

This invention comprehends certain new and useful improvements in sleigh brakes and has for its primary object to provide a sleigh brake which may be readily applied to sleighs of ordinary construction now in general use and which will work automatically to hold back the sleigh and prevent the same from running on to the draft animals when the sleigh is being drawn down a hill.

Another object is to provide a sleigh brake of this character connected with the tongue of the vehicle and which may be locked against operation if desired.

A further object is to provide a sleigh brake of this type which will be of extremely simple construction and operation and highly efficient as well as automatic.

A further object is to provide an automatic brake of this character which will be composed of the minimum number of parts and which will be automatically thrown into operation by forward movement of the sleigh toward the draft animal or animals upon the movement of said sleigh upon a hillside or other incline.

With the above and other objects in view, this invention consists in the novel features of construction, combination and arrangement of parts to be hereinafter more fully described, claimed and illustrated in the accompanying drawings, in which—

Figure 1:
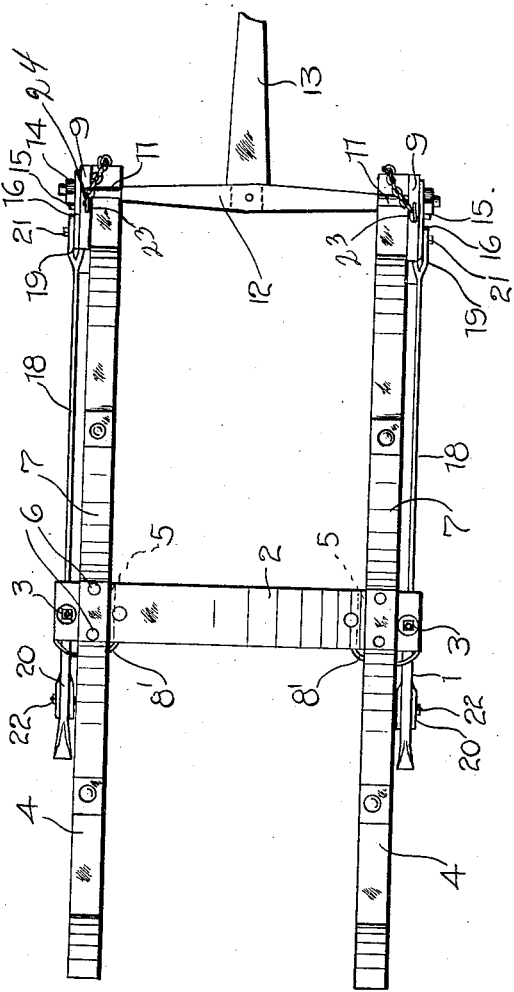
Figure 2:
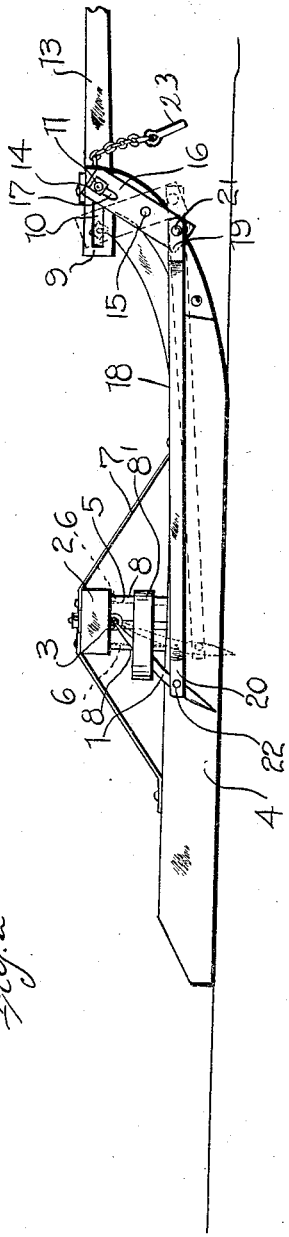

Figure 1, is a top plan view of our invention applied to a sleigh of conventional form. Fig. 2, is a side elevational view of the same.

Referring more particularly to the drawings in which similar reference characters designate corresponding parts throughout the several views, 1 designates the brake arms which are pivoted at their upper ends to the under face of the transverse seat supporting member 2, adjacent the ends of the latter, by means of the screw eyes 3 or the like. The brake arms are of such length as to extend below the sleigh runners 4 when said brake arms are in vertical or operative position.

The transverse seat supporting member 2 is secured upon the standards 5 projecting from the upper faces of the spaced sleigh runners 4 and the parts are braced and reinforced by the bracing and reinforcing vertical rods 6 having their lower ends secured in the runners 4 and their upper ends positioned through the transverse seat supporting member 2 and through the portions of the usual bracing strips 7 extended across the ends of said seat supporting member. It will be understood that the bracing and reinforcing rods 6 are engaged in longitudinal grooves 8 formed in the vertical faces of the standards 5, thereby bracing and reinforcing said standards. The brake arms 1 are positioned outwardly of the standards 5 and sleigh runners 4 and extend through the guide loops 8' secured to the inner vertical faces of the standards 5 and inclosing said standards, the outermost portion of the loops also engaging around the brake arms 1, as will be readily understood by referring to the drawings, said loops preventing outward movement of the brake arms and thereby properly guiding the same to their operative or inoperative positions.

Secured to the outer face of each runner, at the forward upwardly curved end thereof, is the casting 9 which has its upper edge extended a short distance above the upper end of the sleigh runner and is provided with a horizontal bearing and guide slot 10 in its extended portion through which is engaged one end of a rod 11 extending longitudinally through the transverse member 12 within which the inner end of the tongue 13 is secured. It will be understood that the free extremities of the rod 11 are threaded and have the nuts 14 secured thereupon, outwardly of the castings. Mounted upon the outer end of a bolt 15 secured through each casting 9 is a lever arm 16. The lever arm 16 has an elongated opening 17 in its upper end through which the end of the longitudinal rod 11 is engaged, it being understood that the nut 14 is also positioned outwardly of the lever arm. The brake arm operating rod 18 is bifurcated at its opposite ends, as shown at 19 and 20 respectively. The forward bifurcated end 19 is engaged upon opposite faces of the lever arm 16, at the lower end of the latter and a pivot pin 21 is engaged through said lower end of the arm and through the bifurcated forward end 19 of said rod 18. The bifurcated rear end 20 of the rod 18 is likewise engaged upon opposite faces of the brake arm 1, a spaced distance below the longitudinal center of said arm and pivoted to the latter by means of the pivot pin 22 and engaged through said bifurcated end of the rod 18 and through the brake arm 1.

From as much of the description as has preceded, it will be seen that as the sleigh is drawn forward upon a level surface or uphill, the tongue 13 and transverse member 12 will be in their forwardmost positions, thereby retaining the ends of the longitudinal rod 11 of the transverse member 12 in the forward ends of the bracing and guide slots 10 in the castings 9 and holding the upper end of the lever arms 16 in their forwardmost positions, thereby holding the brake arm operating rods 18 and brake arms 1 in their rearward positions, with the lower ends of the brake arms 1 above the lower edges of the runners and the snow surface. Should the draft animals be brought to a sudden stop or should a sleigh be drawn down an incline, however, the weight of the sleigh will cause the same to move nearer the draft animals, thereby bringing the ends of the longitudinal rod 11 to the rear ends of the bearing and guide slots 10, swinging the lever arms 16 upon the extended ends of the bolts 15 and as a result, compelling forward movement of the brake arm operating rods 18 and thereby bearing the brake arms 1 to their vertical or operative positions and engaging the same through the snow surface, resulting in holding back or completely stopping the sleigh, as will be readily understood. As soon as the tongue 13 and transverse member 12 are drawn forwardly with sufficient force to draw the opposite ends of the longitudinal rod 11 to their normal positions at the forward ends of the bearing and guide slots 10, the lever arms 16 and brake arm operating rods 18 will again be reversed or returned to their normal positions, causing the brake arms 1 to return to their normal or inoperative positions.

When it is desired to prevent automatic operation of the brake mechanism, the parts may be locked in inoperative position by inserting the keys 23 in the vertical key openings 24 with the ends of the longitudinal rod 11 in its forwardmost position, the keys 23 being inserted rearwardly of said ends of the rod and thereby preventing the ends from moving rearwardly within the bearing and guide slots 10.

It will be apparent that owing to the simple construction of the various parts of this brake mechanism, the same may be readily and cheaply assembled and secured upon sleighs of ordinary construction now in general use without in the least altering the construction of the sleighs. It will also be evident that should any of the parts become worn or broken they may be readily and cheaply repaired or replaced without interfering with the remaining parts and the complete mechanism may therefore be highly efficient and effective in use.

While we have shown the preferred embodiment of our invention, it will be understood that minor changes in the details of construction may be made within the scope of the appended claims without departing from the spirit of our invention.

Having thus described this invention, what we claim is:—

1. The combination with sleigh runners, means for connecting the sleigh runners, means for bracing the sleigh runners and connecting means, and a tongue; of castings carried by the sleigh runners and having elongated openings, the member at the inner end of the tongue being engaged through the elongated openings of the castings, rock levers pivoted upon the runners, connections between the upper ends of the rock levers and the extremities of the tongue member, brake arm operating rods pivoted to the lower ends of the levers, brake arms suspended from the runner connecting means, said operating rods being pivoted to the brake arms to operate the latter, means for guiding the brake arms, and means for engagement in the castings rearwardly of the tongue member to prevent operation of the levers and rods.

2. The combination with sleigh runners, means for connecting the sleigh runners, means for bracing the sleigh runners and connecting means, and a tongue; of castings carried by the forward ends of the sleigh runners and having elongated horizontal openings, the transverse member at the inner end of the tongue having its extremities engaged through the elongated openings of the castings, rock levers pivoted upon the outer faces of the runners, loose connections between the upper ends of the rock levers and the projecting extremities of the transverse tongue member, brake arm operating rods pivoted to the lower ends of the levers, brake arms suspended from the runner connecting member, said operating rods being pivoted to the brake arms to operate the latter, means for guiding the brake arms, and means for engagement in the castings rearwardly of the ends of the transverse tongue member to prevent operation of the levers and rods.

In testimony whereof we hereunto affix our signatures, in the presence of two witnesses.

HENRY M. SINES.
MARTIN SINES.

Witnesses:
VIVIAN DAVIS,
C. C. KING.

Copies of this patent may be obtained for five cents each, by addressing the "Commissioner of Patents, Washington, D. C."